(12) United States Patent
Park et al.

(10) Patent No.: US 9,112,823 B2
(45) Date of Patent: Aug. 18, 2015

(54) APPARATUS AND METHOD FOR RECEIVING MOBILE MESSAGE

(75) Inventors: Jae-Hyun Park, Gyeonggi-do (KR); Eui-Heon Jeong, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 299 days.

(21) Appl. No.: 13/879,534

(22) PCT Filed: Oct. 14, 2011

(86) PCT No.: PCT/KR2011/007671
§ 371 (c)(1),
(2), (4) Date: Apr. 15, 2013

(87) PCT Pub. No.: WO2012/050395
PCT Pub. Date: Apr. 19, 2012

(65) Prior Publication Data
US 2013/0212203 A1   Aug. 15, 2013

(30) Foreign Application Priority Data
Oct. 15, 2010  (KR) .......................... 10-2010-0101113

(51) Int. Cl.
*G06F 15/16* (2006.01)
*H04L 12/58* (2006.01)
*H04W 4/12* (2009.01)
(Continued)

(52) U.S. Cl.
CPC ............ *H04L 51/04* (2013.01); *H04L 12/5895* (2013.01); *H04L 51/38* (2013.01); *H04L 67/26* (2013.01); *H04W 4/12* (2013.01); *H04L 12/587* (2013.01); *H04L 69/14* (2013.01); *H04M 3/487* (2013.01)

(58) Field of Classification Search
CPC ..................... H04W 4/12–4/18; H04M 3/487
USPC ........................................................ 709/206
See application file for complete search history.

(56) References Cited

U.S. PATENT DOCUMENTS 5,797,094 A     8/1998  Houde et al.
7,953,395 B1 *  5/2011  Richardson et al. .......... 455/413
(Continued)

FOREIGN PATENT DOCUMENTS

EP            1379064        1/2004
EP            1379064 A2 *   1/2004  ............ H04M 1/725
KR         1020100024728     3/2010

OTHER PUBLICATIONS

Huang, et al., Bit-Per-Joule Performance of Power Saving Ad Hoc Networks under Mobile Backbone Coverage, (c) 2006 IEEE, Mar. 2006, pp. 3795-3801.

(Continued)

*Primary Examiner* — Shirley Zhang
(74) *Attorney, Agent, or Firm* — The Farrell Law Firm, P.C.

(57) ABSTRACT

A method and apparatus for receiving a mobile message are provided. The apparatus includes a Short Messaging Service (SMS) client for receiving a short message by using a short message service; a Mobile Message (MM) client for receiving a mobile message; and a push client for, when an arrival notification informing that the mobile message has arrived from a push server is received, informing the MM client that the mobile message has arrived and, when the MM client is turned off, waking the MM client, wherein, when the push client is turned off, the SMS client receives the arrival notification from the push server through a short message.

19 Claims, 8 Drawing Sheets

(51) Int. Cl.
*H04L 29/08* (2006.01)
*H04M 3/487* (2006.01)
*H04L 29/06* (2006.01)

(56) References Cited

U.S. PATENT DOCUMENTS

2006/0116142 A1* 6/2006 Cofta .......................... 455/466

2010/0042856 A1 2/2010 Tsai et al.

OTHER PUBLICATIONS

PCT/ISA/237 Written Opinion issued on PCT/KR2011/007671 pp. 3.
PCT/ISA/210 Search Report issued on PCT/KR2011/007671 pp. 3.

* cited by examiner

APPARATUS AND METHOD FOR
RECEIVING MOBILE MESSAGE

PRIORITY

This application is a National Phase Entry of PCT International Application No. PCT/KR2011/007671, which was filed on Oct. 14, 2011, and claims priority to Korean Patent Application Serial No. 10-2010-0101113, which was filed in the Korean Intellectual Property Office on Oct. 15, 2010, the entire content of each of which is incorporated herein by reference.

BACKGROUND OF THE INVENTION

1. Field of the Invention

The present invention relates generally to an apparatus for receiving a mobile message, and more particularly to a mobile message receiving device capable of effectively managing a battery.

2. Description of the Related Art

Recently, due to a rapidly increasing supply of mobile terminals such as smart phones, various mobile messaging services are actively being used on wireless networks. Such mobile messaging services include a basic voice call service, a Multimedia Messaging Service (MMS), a mobile e-mail service, a Social Network Service (SNS), an Instant Messaging Service (IMS), Really Simple Syndication (RSS), mobile advertisements, video calls, Push-to-Talk, Push-to-Video, and conference calls.

Among such services, IMS is a representative mobile messaging service. The IMS is a service that displays a received message on a screen of a terminal, which is being used by a user when the user currently accesses a server, so that the user, upon receiving the message, can promptly reply to the message. Further, SNS is a service that enables a human network to be configured online, and has been continuously grown while being interworked with Web 2.0.

The mobile messaging services combine with mobile services supplied through a mobile terminal such as a smart phone, and therefore, mobile messaging services have been increasing in popularity due to the simplicity and practicality of use.

FIGS. 1 and 2 are diagrams illustrating a system for transmitting/receiving a conventional instant message.

As shown in FIG. 1, in systems sending and receiving an instant message between mobile terminals in a wireless network environment, Instant Message (IM) client 11-1 and Instant Message (IM) server 13-1 communicate with each other and transmit/receive the instant message when a user uses an instant messaging application. Specifically, when the instant message arrives, the IM server 13-1 transmits the instant message together with reply information to a push server 13-2. Then, the push server transmits an arrival notification indicating that the instant message has arrived, to a push client 11-2 in a mobile terminal. Subsequently, the push client 11-2 transmits the arrival notification to the IM client 11-1. Finally, the IM client 11-1, upon receiving the arrival notification, receives the instant message having arrived from the IM server 13-1.

The push client 11-2 receives the arrival notification from the push server 13-2 through an Internet Protocol (IP) push. IP push is a technology used in wired/wireless communication, and corresponds to a scheme that, when a user determines conditions under which information will be delivered, transmits the information to the user according to the conditions. An SMS push corresponds to a scheme of transmitting information such as a short message or an advertisement by using an SMS.

Meanwhile, as shown in FIG. 2, when the user does not use the instant message application, the IM client 11-1 is turned off, but the push client 11-2 operating in the mobile terminal is not turned off and remains always turned on. Accordingly, when another user sends an instant message, the push client 11-2 always receives the arrival notification for the instant message through the push server 13-2 to function to activate (or wake) the IM client 11-1.

Such a conventional system can be used to respond to a mobile message, such as an instant message in real time, but such systems are significantly inefficient in managing a battery, since the push client 11-2 is always turned on within the mobile terminal 11. When the push client 11-2 is turned on, it can be seen that a usable time of the mobile terminal is markedly reduced in comparison with a case where the push client is turned off Accordingly, in order to address the problem with regard to the battery, many users turn off a push function by using a function of setting an instant message receiving method included in the mobile terminal 11. However, the setting function only turns the IM client off, while the actual push client 11-2 remains continuously turned on, and therefore, the effect of using the setting function is not significant.

SUMMARY OF THE INVENTION

Accordingly, the present invention has been made to solve the above stated problems occurring in the prior art, and an aspect of the present invention provides an apparatus and a method for receiving a mobile message, which receives an arrival notification of the mobile message such as an instant message through an SMS push instead of an IP push so that a usable time of a battery can be extended and includes a module capable of setting a method of receiving the arrival notification of the mobile message transmitted to the IP push and the SMS push.

In accordance with an aspect of the present invention, an apparatus for receiving a mobile message is provided. The apparatus includes a Short Messaging Service (SMS) client for receiving a short message by using a short message service; a Mobile Messaging (MM) client for receiving a mobile message; and a push client for, when an arrival notification informing that the mobile message has arrived from a push server is received, informing the MM client that the mobile message has arrived and, when the MM client is turned off, waking the MM client, wherein, when the push client is turned off, the SMS client receives the arrival notification from the push server through a short message.

In accordance with another aspect of the present invention, a method of receiving a mobile message is provided. The method includes setting a receiving method by which one client to receive an arrival notification of a mobile message from a push server is set among an SMS client and a push client within a mobile message receiving apparatus; receiving the arrival notification according to the set receiving method; and receiving, by the mobile message receiving apparatus, the mobile message according to the arrival notification.

In accordance with another aspect of the present invention, a system for transmitting/receiving a mobile message is provided. The system includes a mobile message receiving apparatus including an SMS client for receiving a short message, an MM client for receiving a mobile message, and a push client for, when an arrival notification informing that the mobile message has arrived from a push server is received, informing the MM client that the mobile message has arrived; an MM server for transmitting the mobile message to the push server; the push server for transmitting the arrival notification informing that the mobile message has arrived to at least one of the push client and an SMS center; and the SMS center for transmitting the received arrival notification to the SMS client, wherein, when the MM client is turned off, the push client wakes the MM client and, when the push client is turned off, the SMS client receives the arrival notification from the push server through a short message.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
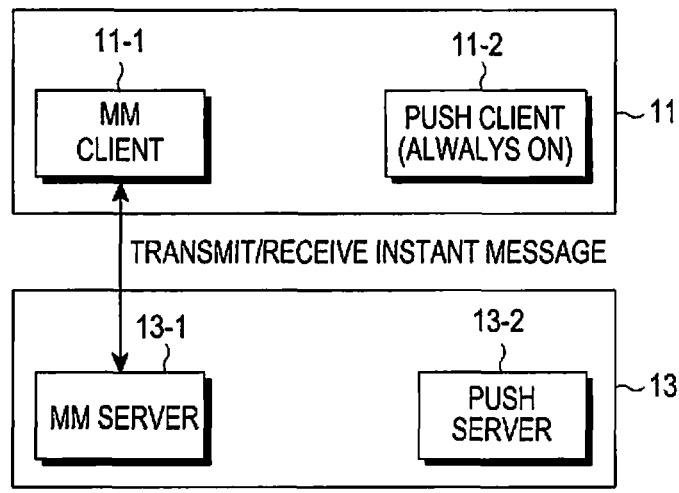
FIGS. 1 and 2 are diagrams illustrating conventional systems for transmitting/receiving an instant message.
Figure 2:
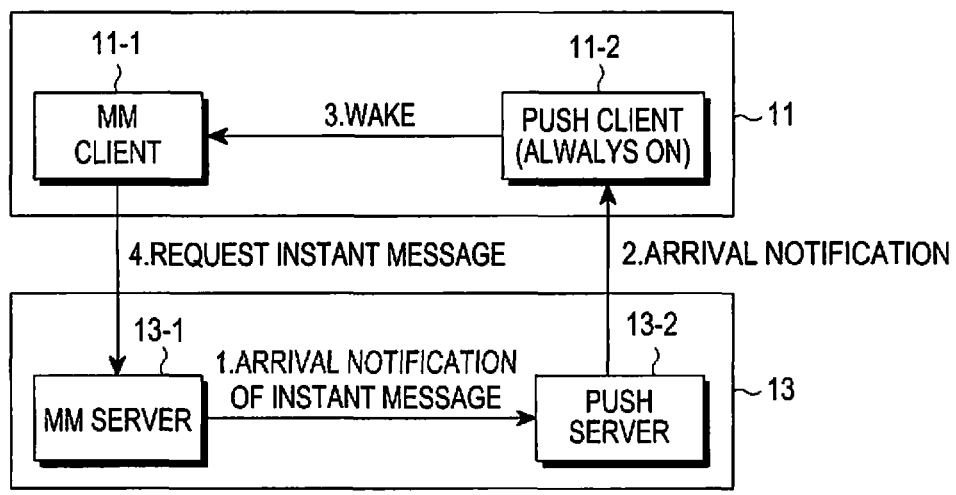

Hereinafter, embodiments of the present invention are described with reference to the accompanying drawings. It should be noted that the same or similar elements may be designated by the same or reference numerals throughout the description. In the following description, detailed descriptions of well-known functions and constructions may be omitted to avoid unnecessarily obscuring the subject manner of the present invention.

Figure 3:
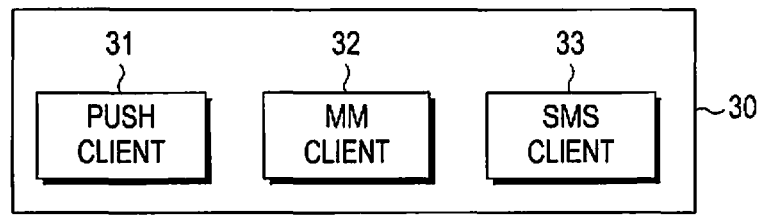
FIG. 3 is a diagram illustrating a mobile message receiving apparatus according to embodiments of the present invention.

FIG. 3 is a diagram illustrating a mobile message receiving apparatus according to embodiments of the present invention.

As shown in FIG. 3, a mobile message receiving apparatus 30 according to an embodiment of the present invention includes a push client 31, a Mobile Messaging (MM) client 32, and an SMS client 33.

The push client 31 receives an arrival notification in order to allow the mobile message receiving apparatus 30 to receive an IP push type mobile message. After the push client 31 receives the arrival notification indicating that the mobile message has arrived from a push server, the push client 31 informs the MM client 32 that the mobile message has arrived. When the MM client 32 is off, the push client 31 activates (or awakens) the MM client 32 and then informs the MM client 32 that the mobile message has arrived.

The MM client 32 receives the arrival notification of the mobile message from the push client 31, receives the mobile message, and then relays the received mobile message. More specifically, the MM client 32 provides a function of providing accessing user information, which shows a list of communicatable accessing users who currently access a network, and provides information for informing other accessing users that the user himself/herself is in a communicatable state. The MM client 32 transmits text based low capacity data. The MM client 32 can also generally transmit high capacity data such as a dynamic image, as well as a still image and uses an IP push, unlike the SMS client 33 using SMS push.

The SMS client 33 allows the mobile message receiving apparatus 30 to receive an SMS. The SMS received through the SMS client 33 is generally provided with a reply number and message contents, and may be also provided with, for example, various additional functions such as a function of controlling a portable terminal. The SMS client 33 receives the SMS using the SMS push, and an SMS push client operates (or remains turned on) while always staying turned on within the mobile message receiving apparatus 30.

Figure 4:
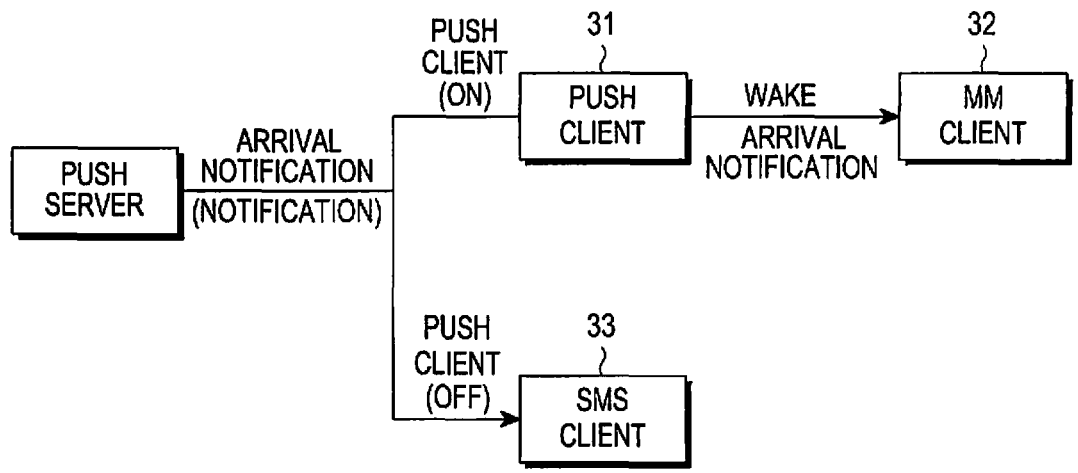
FIG. 4 is a diagram illustrating a mobile message receiving apparatus according to embodiments of the present invention.

FIG. 4 is a diagram illustrating an operation of a mobile message receiving apparatus according to embodiments of the present invention.

As shown in FIG. 4, the mobile message receiving apparatus 30 receives the arrival notification indicating that the mobile message has arrived from an outside push server. A method of receiving the arrival notification by the mobile message receiving apparatus 30 includes a method using the IP push and a method using the SMS push. First, when the push client 31 is turned on, the mobile message receiving apparatus 30 receives the arrival notification through the IP push. Then, the push client 31 informs the MM client 32 that the mobile message has arrived. At this time, if the user turns off the MM client 32, the push client 31 activates the MM client 32 and then informs the MM client 32 that the mobile message has arrived.

If the user of the mobile message receiving apparatus 30 has turned off the push client 31 in order to reduce battery consumption, the mobile message receiving apparatus 30 receives the arrival notification of the mobile message through the SMS client 33 by using SMS push.

Figure 5:
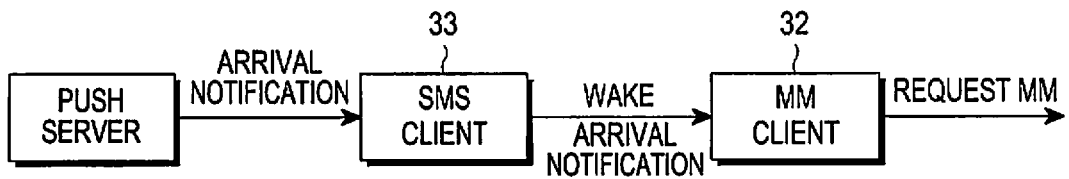
FIGS. 5 and 6 are diagrams illustrating operations in which the mobile message receiving apparatus of FIG. 4 receives the mobile message after an SMS client receives an arrival notification of the mobile message according to an embodiment of the present invention.
Figure 6:
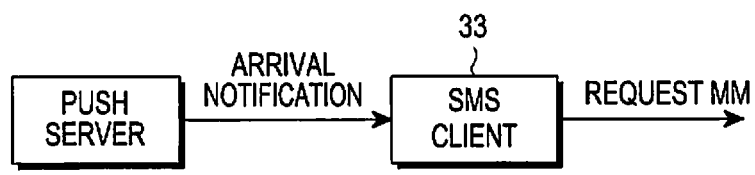

FIGS. 5 and 6 are diagrams illustrating operations in which the mobile message receiving apparatus of FIG. 4 receives the mobile message after the SMS client receives the arrival notification of the mobile message according to an embodiment of the present invention.

As shown in FIG. 5, the SMS client 33, according to an embodiment of the present invention, receives the arrival notification of the mobile message, activates the MM client 32, and then informs the MM client 32 that the mobile message has arrived. Then, the MM client 32 receives the mobile message.

As shown in FIG. 6, the SMS client 33, according to an embodiment of the present invention, receives the arrival notification of the mobile message, and then directly receives the mobile message. In this case, the mobile message is converted into an SMS type (e.g. a text included in the mobile message is converted to the SMS type) and the SMS client 33 receives the converted mobile message.

Figure 7:
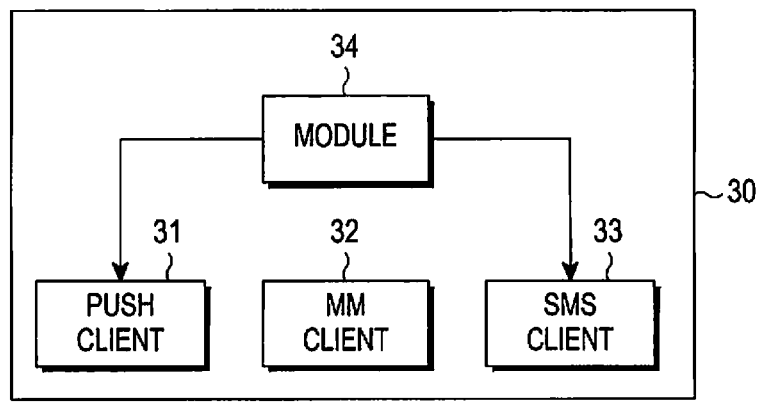
FIG. 7 is a diagram illustrating a construction of a mobile message receiving apparatus according to an embodiment of the present invention.

FIG. 7 is a diagram illustrating a construction of the mobile message receiving apparatus of FIG. 4 according to an embodiment of the present invention.

As shown in FIG. 7, the mobile message receiving apparatus 30 according to an embodiment of the present invention further includes a module 34 for setting a receiving method through which a client to receive the arrival notification of the mobile message is selected from the SMS client 33 and the push client 31.

The user can identify the settings for the module 34 through a display installed in the mobile message receiving apparatus 30. Further, the user can set the mobile message arrival notification receiving method by directly controlling the module 34 through an input unit, such as a touch screen or a keypad installed in the mobile message receiving apparatus 30, or by controlling the module 34 by using wired/wireless communication through another mobile terminal. Accordingly, the user can easily change the settings of the mobile message arrival notification receiving method, such as an IP push to an SMS push or from an SMS push to an IP push, through an interface, such as an interface provided by the display and the input unit.

Further, the module 34 can automatically set the mobile message arrival notification receiving method. For example, when the user moves from an environment where wireless internet communication is possible to an environment where wireless internet communication is impossible, the receiving method may be automatically set from an IP push to an SMS push.

According to an embodiment of the present invention, when the module 34 sets such that the arrival notification is received by the SMS client 33, the push client 31 and the MM client 21 are turned off.

Further, according to an embodiment of the present invention, when the setting is changed from a state where the arrival notification is received by the SMS client 33 to a state where the arrival notification is received by the push client 31, the push client 31 is automatically turned on. Subsequently, when the push client 31 receives the arrival notification, the push client 31 activates the MM client 32 and allows the MM client 32 to receive the instant message.

Figure 8:
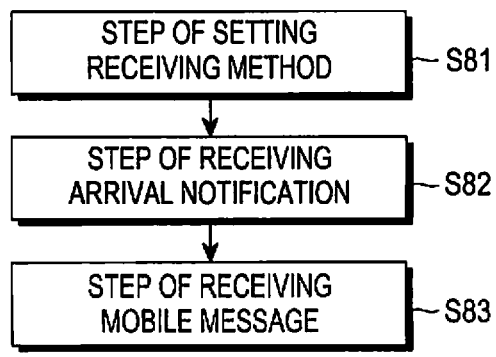
FIG. 8 is a flowchart illustrating a mobile message receiving method according to an embodiment of the present invention.

FIG. 8 is a flowchart illustrating a mobile message arrival notification receiving method according to an embodiment of the present invention.

Referring to FIG. 8, in step S81, the mobile message receiving apparatus sets one client, from among the SMS client 33 and the push client 31 within the mobile message receiving apparatus 30, to receive the arrival notification of the mobile message from the push server. In step S82, the mobile message receiving apparatus receives the arrival notification according to the receiving method set in step S81 of setting the receiving method. In step S83, the mobile message receiving apparatus 30 receives the mobile message according to the received arrival notification.

According to an embodiment of the present invention, in step S81, when the module 34 applies settings such that the arrival notification is received by the SMS client 33, the push client 31 and the MM client 32 are turned off.

Figure 9:
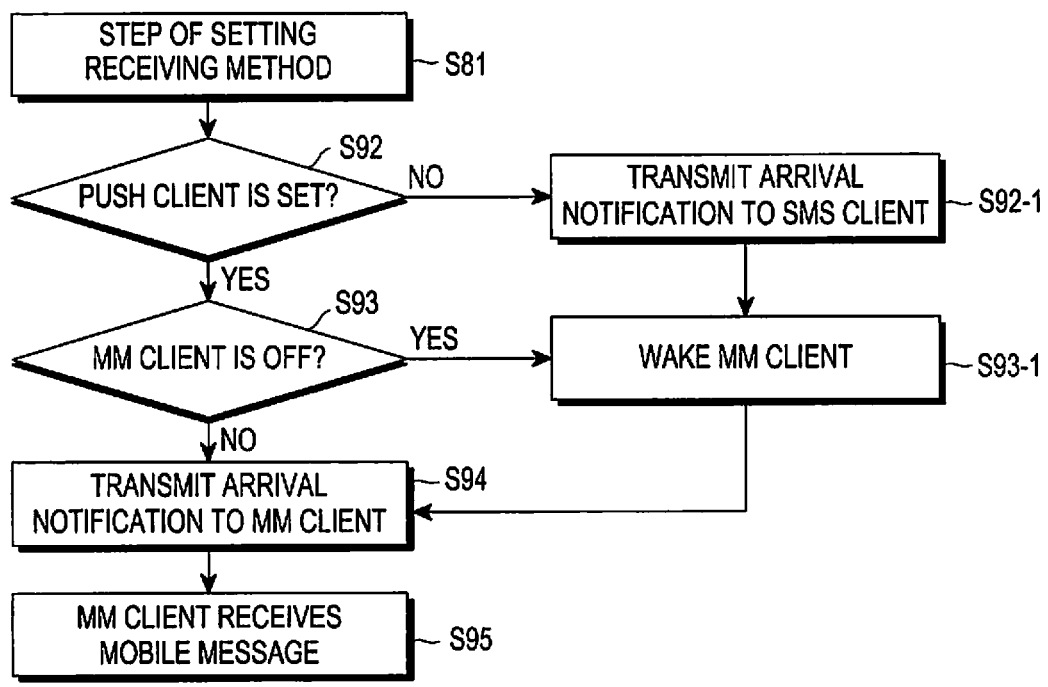
FIGS. 9 and 10 are flowcharts illustrating operations from setting the mobile message receiving method to receiving the mobile message in FIG. 8 according to an embodiment of the present invention.
Figure 10:
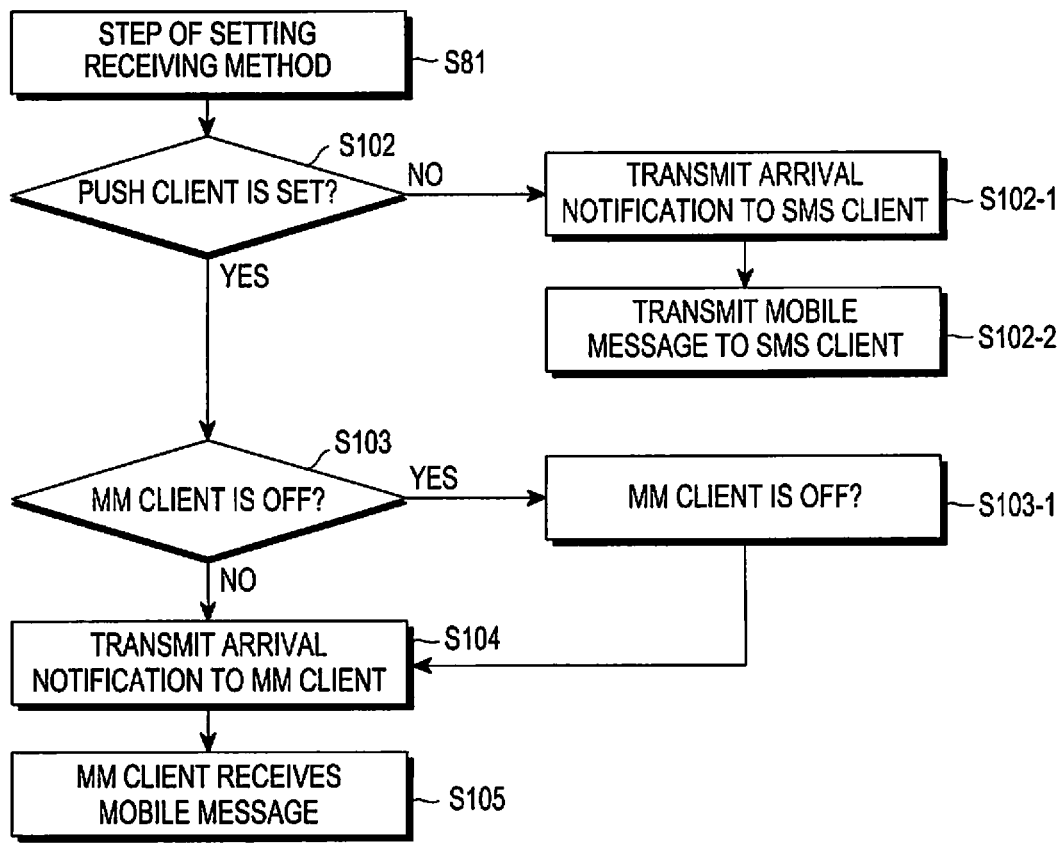

FIGS. 9 and 10 are flowcharts illustrating operations from setting the receiving method to receiving the mobile message in FIG. 8 according to an embodiment of the present invention.

As shown in FIG. 9, the mobile message arrival notification receiving method according to an embodiment of the present invention includes setting a method of receiving the arrival notification of the mobile message and then determining a type of the set receiving method in step S92.

As a result of the determination of step S92, when the receiving method is set such that the push client receives the arrival notification via an IP push, the push client 31 receives the arrival notification, proceeds to step S93, and then determines whether the MM client 33 is turned on. As a result of the determination of step S93, when the MM client 33 is turned on, the push client 31 transmits the arrival notification to the MM client 33 and allows the MM client 33 to receive the mobile message. As a result of the determination of step S93, when the MM client 33 is turned off, the push client 31 activates the MM client 33 S93-1, transmits the arrival notification to the MM client 33 S94, and allows the MM client 33 to receive the mobile message S95.

As a result of the determination of step S92, when the receiving method is set such that the SMS client (SMS push manner) receives the arrival notification, the SMS client 33 proceeds to step S92-1 and receives the arrival notification. Then, in step S93-1, the SMS client 33 activates the MM client 33, proceeds to step S94, and transmits the arrival notification to the MM client 33. Subsequently, the MM client 33 receives the mobile message in step S95.

As shown in FIG. 10, a mobile message arrival notification receiving method according to an embodiment of the present invention includes setting a method of receiving the arrival notification of the mobile message and then determining a type of the set receiving method in step S102.

As a result of the determination of step S102, when the receiving method is set such that the push client (IP push manner) receives the arrival notification, the push client 31 receives the arrival notification, proceeds to step S103, and then determines whether the MM client 33 is turned on. As a result of the determination of step S103, when the MM client 33 is turned on, the push client 31 transmits the arrival notification to the MM client 33 S104 and allows the MM client 33 to receive the mobile message S105. As a result of the determination of step S103, when the MM client 33 is turned off, the push client 31 activates the MM client 33 S103-1, transmits the arrival notification to the MM client 33 S104, and allows the MM client 33 to receive the mobile message S105.

As a result of the determination of step S102, when the receiving method is set such that the SMS client receives the arrival notification (i.e., the receiving method is an SMS push method), the SMS client 33 proceeds to step S102-1 and receives the arrival notification. Then, in step S102-2, the SMS client 33 receives the mobile message. In this case, the mobile message is converted to an SMS type (e.g. a text included in the mobile message is converted to the SMS type) and the SMS client 33 receives the converted mobile message.

Figure 11:
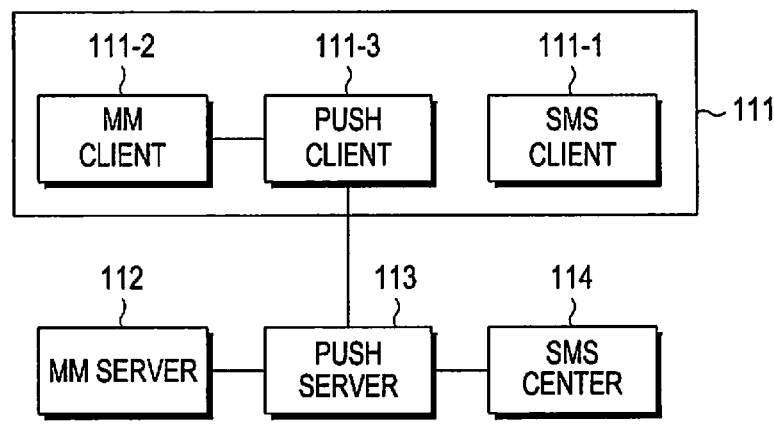
FIGS. 11 and 12 are diagrams illustrating mobile message transmitting/receiving systems according to embodiments of the present invention.
Figure 12:
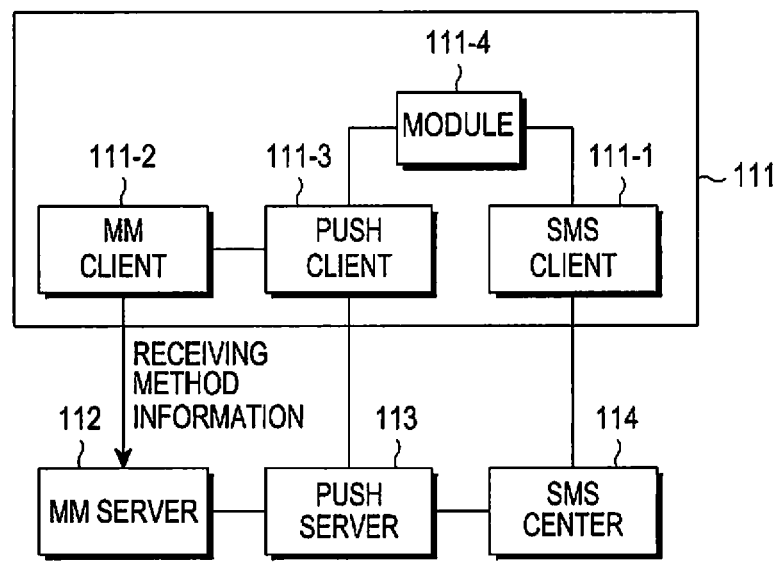

FIGS. 11 and 12 are diagrams illustrating mobile message transmitting/receiving systems according to embodiments of the present invention.

As shown in FIG. 11, the mobile message transmitting/receiving system according to an embodiment of the present invention includes a mobile message receiving apparatus 111, a Mobile Messaging (MM) server 112, a push server 113, and an SMS center 114. The mobile message receiving apparatus 111 includes an SMS client 111-1, an MM client 111-2, and a push client 111-3.

The SMS client 111-1 allows the mobile message receiving apparatus to receive a short message service. The SMS client 111-1 is generally provided with a reply number and message contents. The SMS client 111-1 may also be provided with various additional functions, such as a function for controlling the mobile message receiving apparatus 111. The SMS client 111-1 receives an SMS from the SMS center 114 by using SMS push, and an SMS push client operates (or is turned on) while always staying turned on within the mobile message receiving apparatus 111.

The MM client 111-2 receives the arrival notification of the mobile message from the push client 111-3, and then receives the mobile message. The MM client 111-2 provides a function of providing accessing user information, which shows a list of communicatable accessing users who are currently accessing a network, and provides information for informing other accessing users that the user himself/herself is in a communicatable state. The MM client 111-2 transmits text based low capacity data. Further, the MM client 111-2 can generally transmit high capacity data, such as a dynamic image, as well as a still image and uses IP push, in contrast to the SMS client 111-1 using SMS push. The MM client 111-2 transmits information on the set mobile message arrival notification receiving method to the MM server 112. The MM server 112, upon receiving the receiving method, transmits the information on the receiving method to the push server 113 to enable the arrival notification in accord with the set receiving method to be transmitted to the SMS client 111-1 and the push client 111-3.

The push client 111-3 receives the arrival notification in order to enable the mobile message receiving apparatus to receive the mobile message in the IP push manner. After the push client 111-3 receives the arrival notification informing that the mobile message has arrived from the push server, the push client 111-3 informs the MM client 111-2 that the mobile message has arrived. When the MM client 111-2 is turned off, the push client 111-3 activates the MM client 111-2 and then informs the MM client 111-2 that the mobile message has arrived.

The MM server 112 receives the mobile message, and combines destination information and the information on the receiving method received from the MM client 111-2 to transmit the combined information to the push server 113.

The push server 113 selects one push method from among SMS push and IP push based on the information on the receiving method received from the MM server 112 and accordingly transmits the arrival notification.

The SMS center 114 transmits an SMS message in a mobile communication network. The SMS center 114 includes a function of sending a message to a receiving terminal, a function of resending a message in sending the message, and a function of processing additional services of other text messages. According to an embodiment of the present invention, the SMS center 114 can not only transfer a short message service transmitted to a user to the SMS client 111-1, but can also convert a mobile message transmitted to the user to an SMS to transmit the converted mobile message to the SMS client 111-1, when the push client 111-3 is turned off.

As shown in FIG. 12, a mobile message transmitting/receiving system according to an embodiment of the present invention may further include a module 111-4 within the mobile message receiving apparatus 111. The module 111-4 sets the receiving method of determining one client to receive the arrival notification of the mobile message from the push server among the SMS client 111-1 and the push client 111-3.

The user can identify the settings for the module 111-4 through a display installed in the mobile message receiving apparatus. The user can also set the mobile message arrival notification receiving method by directly controlling the module 111-4 through an input unit, such as a touch screen or a keypad installed in the mobile message receiving apparatus, or by controlling the module 111-4 by using wired/wireless communication through another mobile terminal. Accordingly, the user can easily change the setting of the mobile message arrival notification receiving method from via IP push (i.e., through the IP client) to the SMS push or from SMS push (i.e., through the SMS client) to IP push through an interface, such as the display and the input unit.

Further, the module 111-4 can automatically set the mobile message arrival notification receiving method. For example, when the user moves from an environment where wireless internet communication is possible to an environment where wireless internet communication is impossible, the receiving method may be automatically set from IP push to SMS push.

In embodiments of the present invention according to FIGS. 11 and 12, the SMS client 111-1 receives the mobile message arrival notification and activates the MM client 111-2. Then, the SMS client 111-1 informs the MM client 111-2 that the mobile message has arrived and allows the MM client 111-2 to receive the mobile message.

Further, according to another embodiment of the present invention, the SMS client 111-1 can directly receive the mobile message after receiving the mobile message arrival notification. In this case, the mobile message is converted to an SMS type (e.g. a text included in the mobile message is converted to the SMS type) in the SMS center 114 and the SMS client 111-1 receives the converted mobile message.

According to an embodiment of the present invention, when the module 111-4 sets such that the arrival notification is received by the SMS client 111-1, the push client 111-3 and the MM client 111-2 are turned off.

Further, according to an embodiment of the present invention, when the settings are changed from a state where the arrival notification is received by the SMS client 111-1 to a state where the arrival notification is received by the push client 111-3, the push client 111-3 is automatically turned on. Subsequently, when the push client 111-3 receives the arrival notification, the push client 111-3 activates the MM client 111-2 and allows the MM client 111-2 to receive the instant message.

FIGS. 13 to 16 are diagrams illustrating operations of the mobile message receiving apparatus and the mobile message transmitting/receiving system according to embodiments of the present invention.

Figure 13:
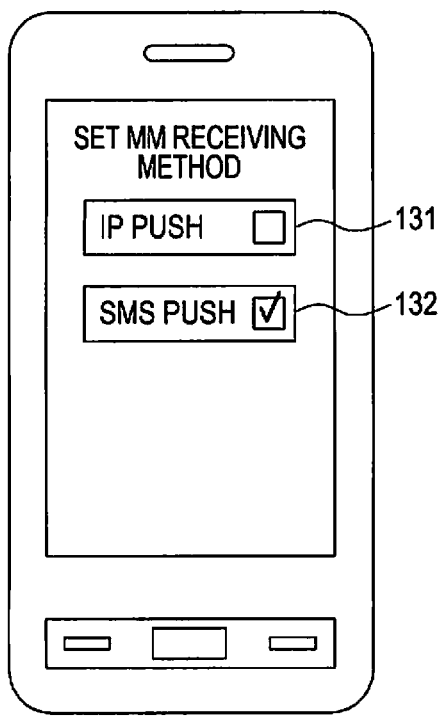
FIGS. 13 to 16 are diagrams illustrating operations of a mobile message receiving apparatus and a mobile message transmitting/receiving system according to embodiments of the present invention.

As shown in FIG. 13, the mobile message receiving apparatus provides a menu for setting one push method for receiving the arrival notification of the mobile message among the IP push 131 and the SMS push 132 through a display installed in the mobile message receiving apparatus. A service that includes the mobile message may be a service that includes a basic voice call service, a Multimedia Messaging Service (MMS), a mobile e-mail service, a Social Network Service (SNS), an Instant Messaging Service (IMS), Really Simple Syndication (RSS), a mobile advertisement service, a video call service, Push-to-Talk, Push-to-Video, and a conference call service, etc.

When IP push is used, the user can freely transmit/receive the mobile message to/from another party's user through a wireless internet environment, regardless of a service of a communication service provider. However, when IP push is used, battery life is reduced, due to power consumption, since the push client must always be turned on. When SMS push is used to address this problem, the problem of the reduction of the battery life due to the power consumption is resolved, since the conventional SMS client is used. However, in this case, contents included in the mobile message or the arrival notification of the mobile message should be transmitted to the mobile message receiving apparatus of the user after being converted to an SMS, so that an additional service by the communication service provider is required, and accordingly, the user may be required to pay costs for the additional service. Accordingly, the user can set a proper receiving method in consideration of a used amount of the battery and a service cost paid to the communication service provider.

When the user sets the receiving method, information on the receiving method is transmitted to the MM server. Then, when the mobile message has arrived, the MM server transmits the arrived mobile message together with the information on the receiving method to the push server. The push server transmits the arrival notification of the mobile message to the SMS center or the push client according to the set receiving method. When the arrival notification is transmitted to the SMS center, the mobile message is converted to an SMS type and then may be transmitted to the SMS client.

Figure 14:
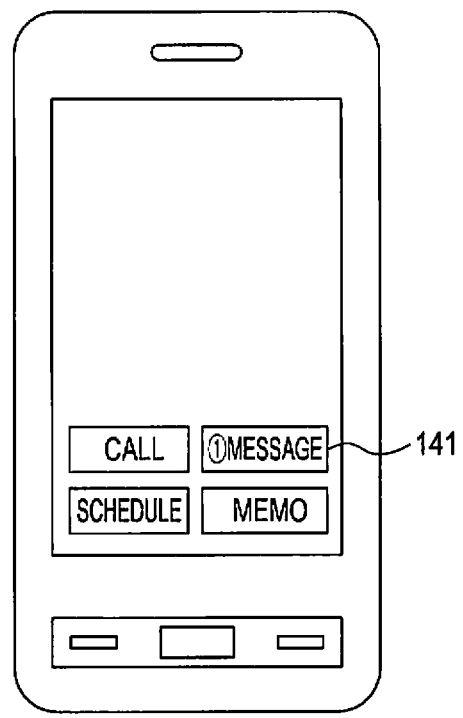

FIG. 14 is a diagram illustrating an example in which the arrival notification is displayed when the mobile message has arrived, in a case where the user sets the SMS push as the mobile message arrival notification receiving method according to an embodiment of the present invention. In the present example, the user can identify an indication, which informs that one mobile message has arrived, in a tab of a message 141 positioned at a lower end of a display of the mobile message receiving apparatus. The user can read the arrived mobile message by performing an action, such as pressing or touching the arrived message tab.

Figure 15:
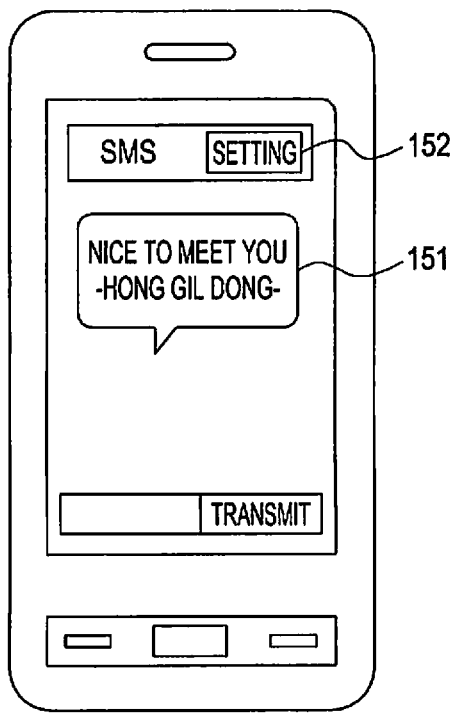

FIG. 15 is a diagram illustrating a screen through which an arrived mobile message may be identified in a text based SMS type message, according to an embodiment of the present invention.

Figure 16:
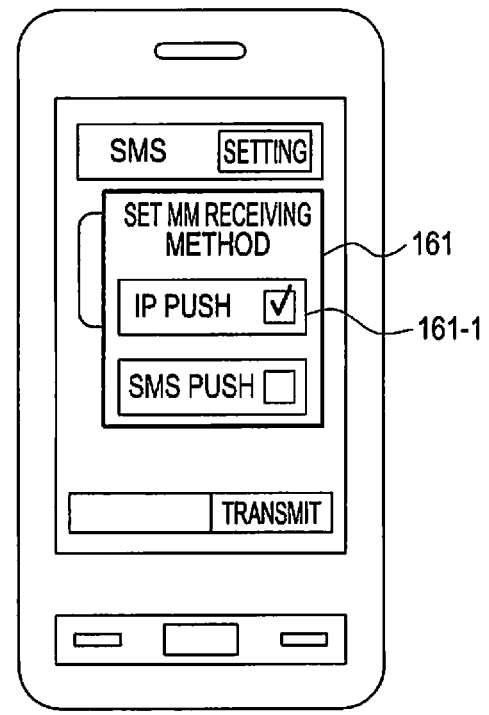

Referring to FIG. 15, a mobile message 151 has been received by setting SMS push as the receiving method, and a popup menu window through which the arrival notification receiving method can be changed is generated by selecting a "setting" 152 tab positioned at an upper end of the display. As shown in FIG. 16, the user can reset the receiving method to IP push 161-1 in the popup menu window 161. Information indicating that the receiving method is reset to IP push is transmitted to the MM server, which is then used in transmitting the arrival notification when the mobile message is received.

As described above, embodiments of the present invention allow a user to select an IP push manner (push client is turned on) or an SMS push manner (push client is turned off) of receiving information according to a user's intention. Further, a mobile message may be transmitted and received even after the push client is turned off, in a system supporting a mobile message transmission/reception between mobile terminals in a wireless network environment.

Accordingly, embodiments the present invention reduce excessive battery consumption that is caused by the push client operating while always staying turned on in conventional mobile message systems. Therefore, a user demand for a basic mobile message service may be satisfied.

While the present invention has been shown and described with reference to certain embodiments thereof, it will be understood by those skilled in the art that various changes in form and details may be made therein without departing from the spirit and scope of the invention as defined by the appended claims and their equivalents.

The invention claimed is:

1. An apparatus for receiving a mobile message, the apparatus comprising:
   a Short Messaging Service (SMS) client for receiving a short message by using a short message service;
   a Mobile Messaging (MM) client for receiving a mobile message; and
   a push client for, when an arrival notification informing that the mobile message has arrived from a push server is received, informing the MM client that the mobile message has arrived and, when the MM client is turned off, waking the MM client,
   wherein, when the push client is turned off, the SMS client receives the arrival notification from the push server through a short message.

2. The apparatus as claimed in claim 1, wherein the SMS client informs the MM client that the mobile message has arrived and, when the MM client is turned off, the SMS client wakes the MM client and allows the MM client to receive the mobile message.

3. The apparatus as claimed in claim 1, wherein the SMS client receives the mobile message after receiving the arrival notification from the push server.

4. The apparatus as claimed in claim 1, further comprising a module for setting one client to receive the arrival notification from the push server, selected from among the SMS client and the push client.

5. The apparatus as claimed in claim 4, wherein, when the module sets such that the arrival notification is received by the SMS client, the push client and the MM client are turned off.

6. The apparatus as claimed in claim 5, wherein, when the module changes a setting of the arrival notification received by the push client to a setting of the arrival notification received by the SMS client, the push client is turned on and, when the push client receives the arrival notification, the push client wakes the MM client and allows the MM client to receive the mobile message.

7. A method of receiving a mobile message, the method comprising:
   setting a receiving method by which one client to receive an arrival notification of a mobile message from a push server is to be received from among receipt by a Short Messaging Service (SMS) client and receipt by a push client within a mobile message receiving apparatus;
   receiving the arrival notification according to the set receiving method; and
   receiving, by a mobile message receiving apparatus, the mobile message according to the arrival notification,
   wherein, in receiving the mobile message, when the push client receives the arrival notification, the push client informs a Mobile Messaging (MM) client of the mobile message receiving apparatus of arrival of the mobile message and the MM client receives the mobile message, and
   wherein, in setting the receiving method, when the receiving method is set such that the arrival notification is received by the SMS client, the push client is turned off.

8. The method as claimed in claim 7, wherein, when the MM client is turned off, the method further comprises waking the MM client by the push client.

9. The method as claimed in claim 7, wherein, in receiving the mobile message, when the SMS client receives the arrival notification, the SMS client receives the mobile message.

10. The method as claimed in claim 7, wherein, in receiving the mobile message, when the SMS client receives the arrival notification, the SMS client wakes the MM client of the mobile message receiving apparatus, informs the MM client that the mobile message has arrived, and the awakened MM client receives the mobile message.

11. The method as claimed in claim 7, wherein, in setting the receiving method, when the receiving method is set such that the arrival notification is received by the SMS client, the push client and the MM client are turned off.

12. A system for transmitting/receiving a mobile message, the system comprising:

a mobile message receiving apparatus including Short Messaging Service (SMS) client for receiving a short message, a Mobile Messaging (MM) client for receiving a mobile message, and a push client for, when an arrival notification informing that the mobile message has arrived from a push server is received, informing the MM client that the mobile message has arrived;

an MM server for transmitting the mobile message to the push server;

the push server for transmitting the arrival notification informing that the mobile message has arrived to at least one of the push client and an SMS center; and the SMS center for transmitting the received arrival notification to the SMS client, wherein, when the MM client is turned off, the push client wakes the MM client and, when the push client is turned off, the SMS client receives the arrival notification from the push server through a short message.

13. The system as claimed in claim 12, wherein the mobile message receiving apparatus further includes:

a module for setting a receiving method by which one client to receive the arrival notification of the mobile message is set among the SMS client and the push client, wherein the mobile message receiving apparatus transmits information on the set receiving method to the MM server, and the push server receives the information on the set receiving method from the MM server and, when the set receiving method is set such that the push client receives the arrival notification, the push server transmits the arrival notification to the push client and, when the set receiving method is set such that the SMS client receives the arrival notification, the push server transmits the arrival notification to the SMS center.

14. The system as claimed in claim 13, wherein, when the set receiving method is set such that the SMS client receives the arrival notification, the SMS client informs the MM client that the mobile message has arrived and, when the MM client is turned off, the SMS client wakes the MM client and allows the MM client to receive the mobile message.

15. The system as claimed in claim 13, wherein, when the set receiving method is set such that the SMS client receives the arrival notification, the SMS client receives the mobile message after receiving the arrival notification from the push server.

16. The system as claimed in claim 13, wherein, when the set receiving method is set such that the arrival notification is received by the SMS client, the push client and the MM client are turned off.

17. The system as claimed in claim 16, wherein, when the module changes a setting of the arrival notification received by the push client to a setting of the arrival notification received by the SMS client, the push client is turned on and, when the push client receives the arrival notification, the push client wakes the MM client and the awakened MM client receives the mobile message.

18. An apparatus for receiving a mobile message, the apparatus comprising:

a Short Messaging Service (SMS) client for receiving a short message;

a Mobile Messaging (MM) client for receiving a mobile message;

a push client for informing the MM client that the mobile message has arrived; and a module for turning off the push client based on a user input and controlling the SMS client to receive the mobile message.

19. The apparatus as claimed in claim 18, wherein the module transmits, to a mobile message push server, a converting message for converting the mobile message to the short message.

* * * * *